Patented Dec. 26, 1939

2,184,495

UNITED STATES PATENT OFFICE 2,184,495

PRINTING ASSISTANT

Charles Graenacher, Riehen, and Max Matter, Basel, Switzerland, assignors to the firm Society of Chemical Industry in Basle, Basel, Switzerland No Drawing. Application May 10, 1938, Serial No. 207,148. In Switzerland May 13, 1937

6 Claims. (Cl. 8—70)

It has been found that acid amides of the general formula

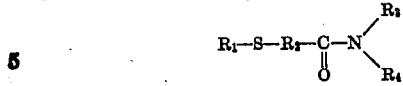

in which $R_1$ is an aliphatic radical, $R_2$ is a member selected from the group consisting of substituted and unsubstituted alkylene radicals, and $R_3$ and $R_4$ are members selected from the group consisting of hydrogen and alkyl radicals, are valuable printing assistants.

These products have the unexpected property, probably due to a swelling phenomenon, of in many cases enhancing the affinity relationships of fiber to dyestuffs. Thus, they render valuable service in the production of prints on various substrata, for instance textiles, leather, paper, pasteboard, wood or the like, in that they strongly enhance the tinctorial strength or the fastness of the color tints produced in their presence. The acid amides of the above general formula are advantageously added to printing pastes by means of which insoluble dyestuffs are fixed on the fiber, whether in direct printing or in processes in which the insoluble dyestuff is only produced on the fiber. Such processes are, for example, those in which vat dyestuffs are produced from their leuco-compounds or their leuco-esters, such as their leuco-sulfuric acid esters, or azo-dyestuffs produced by a coupling operation or a scission (compare French specification No. 815,575). The acid amides of the above general formula may also be used in preparing printing colors suitable for book printing and lithographic printing. These acid amides are thus comparable with the ethers of thiodiglycol which are known as possessing an excellent effect as assistants but have the disadvantage that they are sensitive to acids, particularly hydrochloric acid, whereby they are converted into chlorinated ethers which are known to be dangerously poisonous. Moreover, the amides concerned in this invention have the advantage of being solid bodies which may be mixed, if desired, with dyestuff powders.

The acid amides of the said general formula are in part known. Thus, ethylthioglycollic acid amide has been made by the reaction of ethylthioglycollic acid ester with ammonia. This reaction is indeed generally applicable; it has, however, been found that the amides in question may be made in an advantageous manner by condensing a halogenated carboxylic acid amide with an aliphatic mercaptan or other compound which contains an SH-group, preferably in the form of the corresponding mercaptide.

This reaction occurs when the components are heated together, preferably in the presence of a dispersing agent. Among the products obtainable in this manner and useful in the present invention there may be named ethylthioglycollic acid amide, methylthioglycollic acid amide, hydroxyethylthioglycollic acid amide, ethylthioglycollic acid monomethylamide, ethylthioglycollic acid dimethylamide, ethylthioglycollic acid monoethylamide, ethylthioglycollic acid diethylamide, ethylthioglycollic acid mono-hydroxyethylamide, butylthioglycollic acid amide, condensation products from ethylenedimercaptan and 2 mols chloracetamide of the formula

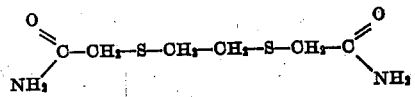

condensation products from ethylenedimercaptan with 2 mols α- or β-bromopropionic acid amide, condensation product from chloromethylether and thioglycollic acid amide, as well as the further compounds derived from the parent materials of the said ethers or condensation products.

The following examples illustrate the invention:—

Example 1

A printing paste is prepared of the following composition:

| | Grams |
|---|---|
| Helindon Violet BB (Colour Index No. 1219) 20 per cent. paste | 100 |
| Potash thickening | 700 |
| Sodium sulfoxylate | 70 |
| Water | 90 |
| Ethylthioglycollic acid amide or condensation product from ethylenedimercaptan and 2 mols chloracetamide | 40 |
| | 1000 |

After printing and drying the goods are steamed for 5 minutes in the Mather-Platt apparatus at 102° C., washed and soaped at the boil. An intense violet print is obtained.

Example 2

A printing paste is prepared as follows:

| | Grams |
|---|---|
| 6:6'-diethoxythioindigo 20 per cent. paste | 100 |
| Potash thickening | 700 |
| Sodium sulfoxylate | 70 |
| Ethylthioglycollic acid amide | 40 |
| Water | 90 |
| | 1000 |

After printing and drying the goods are steamed for 5 minutes in the Mather-Platt apparatus, washed cold and soaped at the boil. There is obtained an intense orange print. Similar results may be produced when other vat dyestuffs, for example a brominated indigo, such as tetrabromindigo, is used.

Example 3

A printing paste is made of the following composition:

| | Grams |
|---|---|
| Cibanone Violet R 20 per cent. paste (loc. cit. No. 1104) | 100 |
| Potash thickening | 700 |
| Sodium sulfoxylate | 80 |
| Ethylthioglycollic acid amide | 40 |
| Water | 80 |
| | 1000 |

Cotton is printed with this paste, dried and steamed for 5–7 minutes in the Mather-Platt apparatus. Finally, it is washed well and soaped for 10 minutes at the boil. An intensely violet print is obtained.

Example 4

A printing paste of the following composition is prepared:

| | | |
|---|---|---|
| Leucosulfuric acid ester of 5:5'-dichloro-7:7'-dimethylthioindigo | grams | 40 |
| Ethylthioglycollic acid amide | do | 80 |
| Water | cc | 320 |
| Neutral starch tragacanth thickening | grams | 450 |
| Ammonium sulfocyanide solution 1:1 | cc | 40 |
| Sodium chlorate solution 1:2 | cc | 50 |
| Vanadium chloride solution 1:100 | cc | 10 |
| Ammonia | cc | 10 |

Cotton is printed with this paste, dried, steamed twice for 5 minutes in the Mather-Platt apparatus, washed, soaped at the boil. An intense and pure violet print is obtained.

Example 5

A printing paste of the following composition is prepared:

| | Grams |
|---|---|
| A preparation of a mixture in approximately molecular proportions of the diazoamino-compound of 4-chloro-1-amino-2-methyl-benzene and 4-sulfo-2-aminobenzoic acid and 2-acetoacetylamino-6-ethoxybenzthiazole | 50 |
| Ethylthioglycollic acid amide or ethylthioglycollic acid monomethylamide | 50 |
| Lukewarm water | 250 |
| Caustic soda solution of 38° Bé | 10 |
| Neutral starch tragacanth thickening | 500 |
| Water | 140 |
| | 1000 |

After printing and drying the goods are steamed in acid vapor for 4 minutes, then rinsed and soaped. There is obtained an intense yellow print.

Example 6

A printing paste is prepared of the following composition:

| | | |
|---|---|---|
| Product of the action of benzoic acid sulfochloride on the azo-dyestuff from diazotized meta-chloraniline and 2:3-hydroxynaphthoic acid anilide | grams | 80 |
| A mixture of 70 per cent. of ethylthioglycollic acid amide and 30 per cent. of urea | grams | 150 |
| Water | cc | 240 |
| Starch tragacanth thickening | grams | 500 |
| Trisodium phosphate solution 1:2 | cc | 30 |

The color is printed on cotton and the goods are dried, steamed in the Mather-Platt apparatus for 5–10 minutes and then passed in the course of 1½ minutes to 2 minutes at room temperature through a solution containing 4–6 per cent. of sodium hydroxide. They are then rinsed, soured, again rinsed and soaped at the boil. There is obtained a fast brilliant orange tint.

Example 7

A printing paste is prepared of the following composition:

| | | |
|---|---|---|
| The product of the action of benzoyl chloride sulfonic acid on the azo-dyestuff from diazotized 2:5-dichloraniline and 2:3-hydroxynaphthoic acid ortho-anisidide | grams | 80 |
| Methylthioglycollic acid amide | do | 150 |
| Water | cc | 240 |
| Starch tragacanth thickening | grams | 500 |
| Trisodium phosphate solution 1:2 | cc | 30 |

The color is printed on cotton and the goods are dried and developed as described in Example 6. There is obtained a fast very clear scarlet red print.

Example 8

A printing paste of the following composition is prepared:

| | | |
|---|---|---|
| The product of the action of 3-benzoyl chloride sulfonic acid on the azo-dyestuff from 4:4'-dichloro-2-amino-1:1'-diphenylether and 2:3-hydroxynaphthoic acid ortho-anisidide | grams | 80 |
| Hydroxyethylthioglycollic acid amide | do | 150 |
| Water | cc | 240 |
| Starch tragacanth thickening | grams | 500 |
| Trisodium phosphate solution 1:2 | cc | 30 |

This color is printed on cotton and the goods are dried and developed as described in Example 6. There is obtained a very fast clear red print.

Example 9

A printing paste is prepared of the following composition:

| | Grams |
|---|---|
| Indulin R base | 20 |
| Ethylthioglycollic acid amide | 80 |
| Acid starch thickening | 600 |
| Acetic acid of 40 per cent strength | 100 |
| Water | 100 |
| A mixture of equal parts of acetic acid of 40 per cent strength and tannin | 100 |
| | 1000 |

Cotton cloth is printed with this paste, dried, steamed for 1–1½ hours, drawn through a bath of tartar emetic, washed and soaped. There is obtained an intense dark blue print.

The acid amides used in the foregoing examples may be also used in admixture with other assistants. Such assistants are in general hydrotropic agents, for instance urea, benzylsulfanilic acid, resorcinol, sugar, salts of alkayl amides of aromatic carboxylic acids such as salts of dimethylaminobenzoic acids, amides of sulfonic acids, for instance cymenesulfamide, ester salts of phthalic acid, for instance the alkali salts of monobutylphthalic acid ester, butylglycol, glycerol or the like.

What we claim is:—

1. Printing colors suitable for printing vegetable and animal fibers, characterized by a content of a dyestuff which is fixed in insoluble form on the fiber, a thickening agent and an acid amide of the general formula

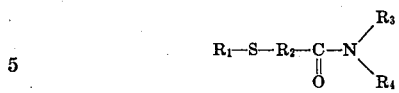

wherein $R_1$ stands for a member selected from the group consisting of lower alkyl, hydroxyalkyl and alkoxylalkyl radicals, $R_2$ stands for methylene, and $R_3$ and $R_4$ stand for a member selected from the group consisting of hydrogen and alkyl radicals.

2. Printing colors suitable for printing vegetable and animal fibers, characterized by a content of a dyestuff which is fixed in insoluble form on the fiber, a thickening agent and an acid amide of the general formula

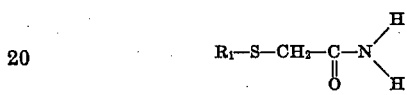

wherein $R_1$ stands for a member selected from the group consisting of lower alkyl, hydroxyalkyl and alkoxyalkyl radicals.

3. Printing colors suitable for printing vegetable and animal fibers, characterized by a content of a dyestuff which is fixed in insoluble form on the fiber, a thickening agent and an acid amide of the general formula

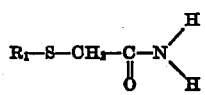

wherein $R_1$ stands for a member selected from the group consisting of lower alkyl, hydroxalkyl and alkoxyalkyl radicals containing not more than two carbon atoms.

4. Printing colors suitable for printing vegetable and animal fibers, characterized by a content of a dyestuff which is fixed in insoluble form on the fiber, a thickening agent and an acid amide of the formula

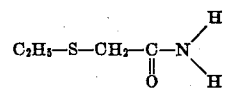

5. Printing colors suitable for printing vegetable and animal fibers, characterized by a content of a dyestuff which is fixed in insoluble form on the fiber, a thickening agent and an acid amide of the formula

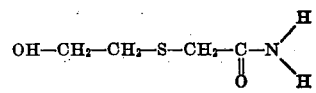

6. Printing colors suitable for printing vegetable and animal fibers, characterized by a content of a dyestuff which is fixed in insoluble form on the fiber, a thickening agent and an acid amide of the formula

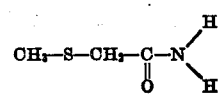

CHARLES GRAENACHER.
MAX MATTER.